United States Patent
Rodriguez Bravo et al.

(10) Patent No.: US 11,603,110 B2
(45) Date of Patent: Mar. 14, 2023

(54) ADDRESSING VEHICLE SENSOR ABNORMALITIES

(71) Applicant: Kyndryl, Inc., New York, NY (US)

(72) Inventors: Cesar Augusto Rodriguez Bravo, San Rafael de Alajuela (CR); Gregory J. Boss, Saginaw, MI (US); David Jaramillo, Durham, NC (US); Romelia H. Flores, Keller, TX (US)

(73) Assignee: Kyndryl, Inc., New York, NY (US)

( * ) Notice: Subject to any disclaimer, the term of this patent is extended or adjusted under 35 U.S.C. 154(b) by 284 days.

(21) Appl. No.: 16/387,538

(22) Filed: Apr. 18, 2019

(65) Prior Publication Data

US 2020/0331484 A1   Oct. 22, 2020

(51) Int. Cl.
*B60W 50/029* (2012.01)
*G06F 21/55* (2013.01)
(Continued)

(52) U.S. Cl.
CPC ...... *B60W 50/029* (2013.01); *B60W 50/0205* (2013.01); *G01D 18/00* (2013.01);
(Continued)

(58) Field of Classification Search
CPC ........... B60W 50/029; B60W 50/0205; B60W 2050/0215; B60W 50/14; G06F 21/554; G07C 5/0808; G07C 5/085; G01D 18/00
See application file for complete search history.

(56) References Cited

U.S. PATENT DOCUMENTS

| 8,126,642 B2 | 2/2012 | Trepagnier et al. |
| 8,392,065 B2 | 3/2013 | Tolstedt et al. |

(Continued)

FOREIGN PATENT DOCUMENTS

| DE | 102011115223 A1 | 3/2013 |
| WO | 2017018743 A1 | 2/2017 |

OTHER PUBLICATIONS

Carlos Crispim-Junior, Qiao Ma, Baptiste Fosty, Rim Romdhane, François Bremond, et al. "Combining Multiple Sensors for Event Detection of Older People", 2015, hal-01854427, https://hal.archives-ouvertes.fr/hal-01854427 (Year: 2015).*

(Continued)

*Primary Examiner* — Rachid Bendidi
*Assistant Examiner* — Selena M Jin
(74) *Attorney, Agent, or Firm* — The Steadman Law Firm PLLC

(57) ABSTRACT

Techniques are described with respect to addressing at least one sensor abnormality associated with a vehicle. An associated method includes receiving a first measurement value from a first sensor among a plurality of sensors associated with a vehicle and receiving a second measurement value from a second sensor among the plurality of sensors. The method further includes identifying at least one sensor abnormality based upon an inconsistency between the first measurement value and the second measurement value. In an embodiment, the at least one sensor abnormality results from at least one sensor defect, at least one vehicle security fault, or a combination thereof. The method further includes completing at least one predefined action to address the at least one sensor abnormality.

19 Claims, 9 Drawing Sheets

(51) Int. Cl.
  *G07C 5/08* (2006.01)
  *B60W 50/02* (2012.01)
  *G01D 18/00* (2006.01)

(52) U.S. Cl.
  CPC ............ *G06F 21/554* (2013.01); *G07C 5/085* (2013.01); *G07C 5/0808* (2013.01); *B60W 2050/0215* (2013.01); *G06F 2221/034* (2013.01)

(56) References Cited

U.S. PATENT DOCUMENTS

| | | | |
|---|---|---|---|
| 8,781,669 | B1 | 7/2014 | Teller et al. |
| 9,195,232 | B1 | 11/2015 | Egnor et al. |
| 9,278,689 | B1 | 3/2016 | Delp |
| 9,368,026 | B1 | 6/2016 | Herbach et al. |
| 9,555,740 | B1 | 1/2017 | Zhu et al. |
| 9,558,601 | B2* | 1/2017 | Lu .......................... B64D 45/00 |
| 9,567,007 | B2 | 2/2017 | Cudak et al. |
| 9,646,428 | B1 | 5/2017 | Konrardy et al. |
| 9,720,410 | B2 | 8/2017 | Fairfield et al. |
| 9,927,813 | B1 | 3/2018 | Ferguson et al. |
| 2003/0009270 | A1* | 1/2003 | Breed .................. B60N 2/2863 701/32.4 |
| 2008/0228350 | A1* | 9/2008 | Gamulescu ........... H04L 12/417 701/33.4 |
| 2009/0240393 | A1* | 9/2009 | Tu .......................... B60T 8/885 701/29.2 |
| 2014/0358353 | A1 | 12/2014 | Ibanez-Guzman et al. |
| 2015/0006020 | A1* | 1/2015 | D'Arbonneau ...... G01C 21/165 701/29.8 |
| 2017/0008487 | A1* | 1/2017 | Ur .......................... G06F 21/577 |
| 2017/0023945 | A1 | 1/2017 | Cavalcanti et al. |
| 2018/0040171 | A1 | 2/2018 | Kundu et al. |
| 2018/0362051 | A1* | 12/2018 | Hu .................. B60W 60/00186 |
| 2019/0138423 | A1* | 5/2019 | Agerstam ............ G06F 11/3447 |
| 2019/0334924 | A1* | 10/2019 | Toyama ............ G08G 1/096716 |
| 2019/0387059 | A1* | 12/2019 | Misumi ................... H04L 67/12 |
| 2019/0389599 | A1* | 12/2019 | Dillard ................... B64D 45/00 |
| 2021/0086791 | A1* | 3/2021 | Hosoi ................... B60W 30/09 |
| 2021/0247518 | A1* | 8/2021 | Campanella .......... G01S 7/4813 |

OTHER PUBLICATIONS

Eliot, Lance. Going Blind: When Sensors Fail on Self-Driving Cars. AI Trends, May 23, 2017 [6 printed pages] <https://www.aitrends.com/ai-insider/going-blind-sensors-fail-self-driving-cars/>.

Heinonen, Tero. All that is wrong with autonomous car sensors and how do we fix the problems. LinkedIn, Oct. 20, 2017 [6 printed pages] <https://www.linkedin.com/pulse/all-wrong-autonomous-car-sensors-how-do-we-fix-tero-heinonen/>.

Frtunikj, Jelena et al. Adaptive Error and Sensor Management for Autonomous Vehicles: Model-based Approach and Run-time System. Model-Based Safety and Assessment. International Symposium on Model-Based Safety and Assessmemt, Oct. 27-29, 2014. Lecture Notes in Computer Science, vol. 8822, pp. 166-180. Ortmeier F., Rauzy A. (eds), Springer, Cham.

Garret, Olivier. 10 Million Self-Driving Cars Will Hit the Road by 2020—Here's How to Profit. Forbes, Mar. 3, 2017 [8 printed pages] <https://www.forbes.com/sites/oliviergarret/2017/03/03/10-million-self-driving-cars-will-hit-the-road-by-2020-heres-how-to-profit/#1f6f12887e50>.

\* cited by examiner

405

410  40 miles/hour 420  60 miles/hour 430  42 miles/hour

400

605

610

40 km/hour

620

100 meters

630

MUTUALLY EXCLUSIVE SCENARIOS

600

ADDRESSING VEHICLE SENSOR ABNORMALITIES

BACKGROUND

The various embodiments described herein generally relate to addressing vehicle sensor abnormalities. More specifically, the various embodiments describe techniques of identifying and responding to at least one sensor abnormality associated with a vehicle.

Autonomous vehicle technology is rapidly emerging, as many vehicle functions become partially or completely controllable via numerous sensors. While increasing vehicle autonomy reduces the necessity of manual vehicle control, numerous risks may emerge consequent to sensor abnormalities arising from security faults and/or defects.

SUMMARY

The various embodiments described herein provide techniques of addressing sensor abnormalities associated with a vehicle, e.g., a partially or fully autonomous vehicle. According to an embodiment, an associated method includes receiving a first measurement value from a first sensor among a plurality of sensors associated with a vehicle and receiving a second measurement value from a second sensor among the plurality of sensors. The method further includes identifying at least one sensor abnormality based upon an inconsistency between the first measurement value and the second measurement value. The method further includes completing at least one predefined action to address the at least one sensor abnormality.

In an embodiment, the step of identifying the at least one sensor abnormality includes, responsive to determining that a vehicle metric measured by the first sensor is comparable to a vehicle metric measured by the second sensor, determining that the first measurement value differs from the second measurement value beyond a predefined threshold, receiving a third measurement value from a third sensor among the plurality of sensors, identifying the first sensor as abnormal responsive to determining that the third measurement value differs from the first measurement value beyond the predefined threshold, and identifying the second sensor as abnormal responsive to determining that the third measurement value differs from the second measurement value beyond the predefined threshold. In a further embodiment, the step of identifying the at least one sensor abnormality includes, responsive to determining that a vehicle metric measured by the first sensor is distinct from a vehicle metric measured by the second sensor, accessing a data structure of mutually exclusive scenarios, determining that the first measurement value and the second measurement value are mutually exclusive based upon the data structure of mutually exclusive scenarios, and identifying at least one of the first sensor and the second sensor as abnormal based upon the determination that the first measurement value and the second measurement value are mutually exclusive.

In an embodiment, the step of completing the at least one predefined action includes, responsive to determining that the at least one sensor abnormality is isolated to a one or more nonessential subsystems of the vehicle, disabling the one or more nonessential subsystems. In another embodiment, the step of completing the at least one predefined action includes, responsive to determining that the at least one sensor abnormality affects overall safety or functionality of the vehicle, disabling all functional capabilities of the vehicle. In a further embodiment, the at least one sensor abnormality results from at least one sensor defect. According to such embodiment, the step of completing the at least one predefined action includes recording vehicle-specific defect metadata based upon the at least one sensor defect and analyzing the vehicle-specific defect metadata in the context of collective defect metadata derived from a plurality of vehicles to identify a pattern with respect to at least one defective vehicle part. According to such embodiment, identifying the pattern with respect to the at least one defective vehicle part optionally includes calculating a similarity factor with respect to analogous vehicle sensors of multiple vehicles that are associated with the at least one defective vehicle part. Furthermore, according to such embodiment, the step of completing the at least one predefined action optionally includes updating a known errors system based upon the identified pattern. Additionally, according to such embodiment, the step of completing the at least one predefined action optionally includes determining a recall protocol with respect to the at least one defective vehicle part based upon the identified pattern.

In an embodiment, the at least one sensor abnormality results from a vehicle security fault. According to such embodiment, the step of completing the at least one predefined action includes identifying, via a security system associated with the vehicle, at least one sensor among the plurality of sensors compromised by the vehicle security fault and executing at least one security recommendation received from the security system based upon analysis of the at least one sensor affected by the vehicle security fault.

One or more additional embodiments include a computer program product including a computer readable storage medium having program instructions embodied therewith. According to such embodiment(s), the program instructions may be executable by a computing device to cause the computing device to perform one or more steps of above recited method. One or more further embodiments include a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
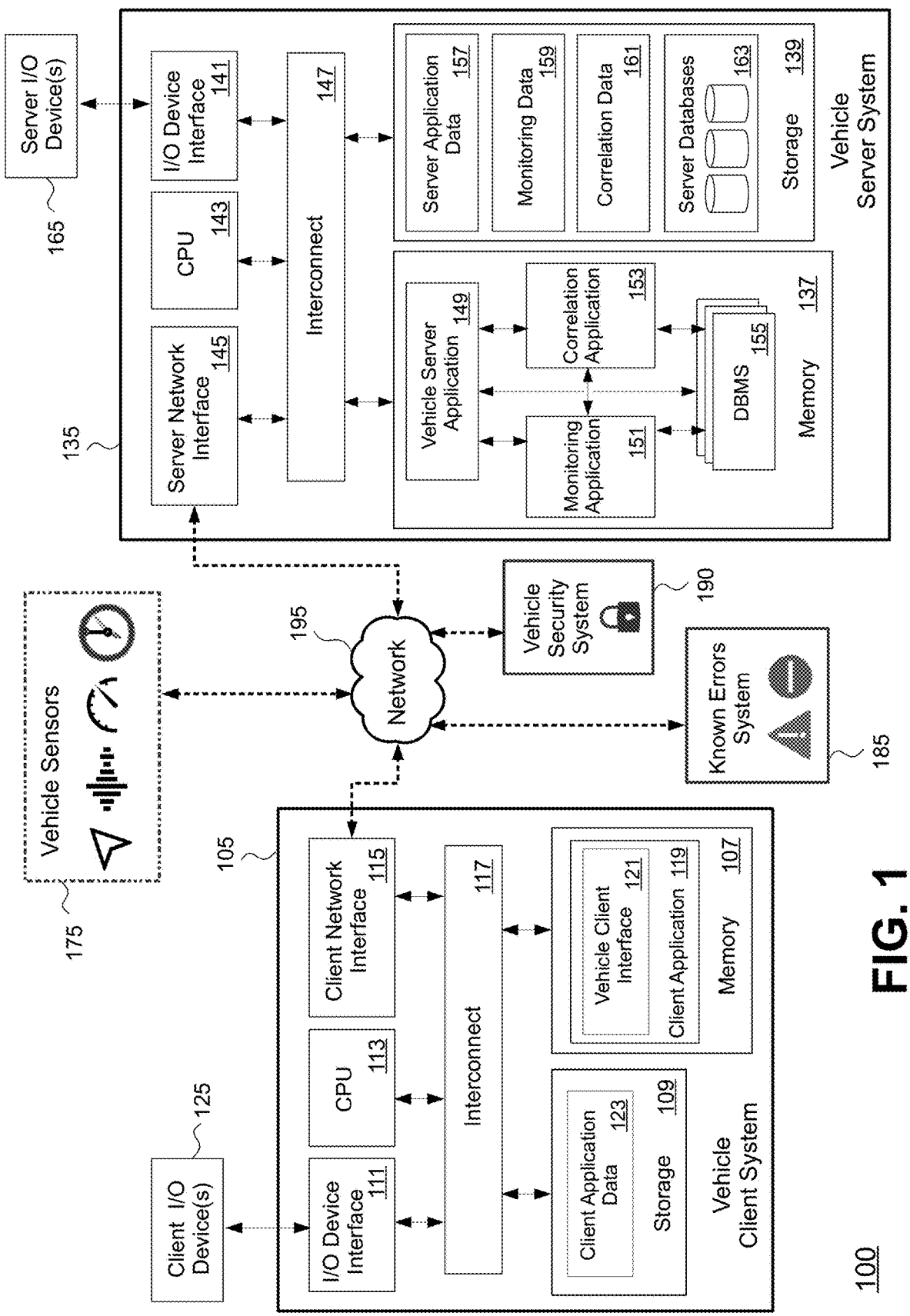
FIG. 1 illustrates a computing infrastructure associated with a vehicle, according to one or more embodiments.

The various embodiments described herein are directed to techniques of addressing sensor abnormalities associated with a vehicle. In an embodiment, a plurality of sensors enables partial or full autonomous control of the vehicle. A vehicle server system configured to implement techniques associated with the various embodiments described herein may identify and respond to at least one abnormality among the plurality of sensors.

The various embodiments described herein may have advantages over conventional techniques. Specifically, the various embodiments may improve computer technology by detecting and addressing sensor abnormalities based in part upon second order verification of sensor functionality. In the context of the various embodiments described herein, first order verification of sensor functionality is defined as direct verification via one or more sensors among a plurality of vehicle sensors (e.g., verifying functionality through measurement(s) received from one or more sensors), while second order verification of sensor functionality is defined as a reinforcement and/or supplementation of first order verification through use of one or more additional sensors among the plurality of vehicle sensors (e.g., determining accuracy of measurement(s) received from one or more sensors by introducing measurement(s) from one or more additional sensors) and/or through the use of additional measurement techniques (e.g., determining accuracy of measurement(s) received from one or more sensors by analyzing the received measurement(s) in the context of a data structure of mutually exclusive scenarios). Addressing sensor abnormalities according to the various embodiments may include facilitating disablement of nonessential vehicle subsystems in the event of relatively minor abnormalities or facilitating total vehicle disablement in the event of abnormalities affecting overall vehicle safety or functionality. Furthermore, based upon identification of sensor abnormalities, the various embodiments may facilitate detection of patterns among defective vehicle parts and/or may facilitate recordation of defect information in a defective vehicle part database. Additionally, the various embodiments may facilitate update of a known errors system and/or may facilitate management of vehicle recalls based upon defect information. Moreover, the various embodiments may enhance or otherwise complement a sensor failover procedure by detecting sensor abnormalities in situations in which affected sensors are least partially responsive to periodic status or data requests sent by a vehicle server application or an application in communication therewith. Specifically, while a sensor failover procedure alone adequately may address situations of unequivocal sensor failure in which affected sensors are unresponsive to requests, detection of sensor abnormalities according to the various embodiments may address scenarios in which a sensor failover procedure alone may not sufficiently detect and/or address an issue, e.g., a scenario in which one or more sensors are malfunctioning albeit partially responsive or fully responsive to requests. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to addressing vehicle sensor abnormalities. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100 associated with a vehicle, according to an embodiment. Functional aspects of the vehicle as well as aspects of computing infrastructure 100 may permit partial or full autonomous operation of a vehicle central control system and/or one or more vehicle subsystems (e.g., steering, acceleration/braking, drivetrain, safety, climate control, etc.). As shown, computing infrastructure 100 includes a vehicle client system 105, a vehicle server system 135, a plurality of vehicle sensors 175, a known errors system 185, and a vehicle security system 190, each connected to a communications network 195.

Illustratively, vehicle client system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of vehicle client system 105 are accessed or controlled by one or more clients, such as vehicle occupants (e.g., vehicle driver or one or more passengers) and/or other parties associated with the vehicle (e.g., a party having partial or full remote/supervisory control of the vehicle). Although shown as a single computing system, vehicle client system 105 is included to be representative of a single client or multiple clients. In an embodiment, client computing system 105 is a thin client. Memory 107 includes a client application 119. Client application 119 may be an online application configured for interfacing with vehicle server system 135 and other computing systems. Client application 119 includes a vehicle client interface 121. Vehicle client interface 121 includes a graphical user interface (GUI) and/or a sensory interface (e.g., capable of discerning client sound/voice commands). One or more components of a GUI or sensory interface included in vehicle client interface 121 may facilitate client input and/or may facilitate display of application data. In the event of multiple vehicle clients (e.g., both a driver and a party having partial remote/supervisory control of the vehicle), multiple instances of vehicle client system 105 may be present, each of which having a respective client application 119 including at least one respective vehicle client interface 121. Storage 109 includes client application data 123 associated with client application 119. I/O device interface 111 is communicatively coupled to one or more vehicle client I/O devices 125 (e.g., touchscreen console, trackpad, joystick, microphone, speaker, etc.). The one or more clients associated with the vehicle may interact with vehicle client interface 121 via the one or more vehicle client I/O devices 125. CPU 113 is included to be representative of a single CPU, multiple CPUs, a single CPU having multiple processing cores, and the like. Client network interface 115 is configured to receive data from and transmit data to vehicle server system 135 via network 195.

In an embodiment, vehicle server system 135 includes, or is otherwise operatively coupled to, some or all aspects of the vehicle central control system and/or one or more vehicle subsystems. In an alternative embodiment, vehicle server system 135 is communicatively coupled to some or all aspects of the vehicle central control system and/or one or more vehicle subsystems. Although shown as a single computing system, vehicle server system 135 is included to be representative of a single server system or multiple server systems. One or more vehicle subsystems optionally are represented within vehicle server system 135. Additionally or alternatively, respective vehicle subsystems are represented via one or more specialized vehicle server subsystems communicatively coupled to vehicle server system 135 and/or connected directly to network 195. In an embodiment, vehicle server system 135 includes a single hardware server configured to provide hosting capabilities. In an alternative embodiment, vehicle server system 135 includes, or is otherwise operatively coupled to, a plurality of hardware and/or virtualized servers configured to provide hosting capabilities. In a further alternative embodiment, vehicle server system 135 is a cloud server system configured to provide distributed hosting capabilities via a plurality of cloud computing nodes in a cloud computing environment. According to such further alternative embodiment, such cloud computing nodes are configured to communicate with one another. Additionally, according to such further alternative embodiment, such cloud computing environment optionally offers infrastructure, platforms, and/or software as services for which client computing system 105 or other systems associated with computing infrastructure 100 need not maintain resources locally.

Illustratively, vehicle server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes a vehicle server application 149, a monitoring application 151, a correlation application 153, and a database management system (DBMS) 155. DBMS 155 is included to be representative of a single database system or multiple database systems. Vehicle server application 149 is configured to address at least one sensor abnormality associated with the vehicle according to the various embodiments described herein. In an embodiment, vehicle server application 149 facilitates authentication of vehicle client system 105 and/or other client systems in computing infrastructure 100. In an alternative embodiment, vehicle server application 149 sends authentication information associated with vehicle client system 105 and/or other client systems to an external directory server system, which may in turn perform any necessary authentication steps.

Monitoring application 151 is configured to gather and monitor data associated with the vehicle. For instance, monitoring application 151 is configured to monitor one or more of analog vehicle sensors among the plurality of vehicle sensors 175, digital vehicle sensors among the plurality of vehicle sensors 175, aspects of vehicle server system 135, any computer(s) associated with respective vehicle subsystems, information from any cloud service accessed via network 195, vehicle connectivity aspects, and information/commands input by the one or more clients associated with the vehicle.

Correlation application 153 is configured to correlate actions performed by the vehicle with respect to all available data in order to identify and/or address possible abnormalities associated with the vehicle, such as one or more abnormalities among the plurality of vehicle sensors. In an embodiment, correlation application 153 measures data correlation with respect to measurements from two or more of the plurality of vehicle sensors 175 in order to facilitate identification of at least one sensor abnormality. According to such embodiment, correlation application 153 facilitates identification of at least one sensor abnormality based upon a sensor measurement inconsistency determined through measurement(s) from additional sensor(s) among the plurality of vehicle sensors 175. Additionally or alternatively, correlation application 153 facilitates identification of at least one sensor abnormality based upon a sensor measurement inconsistency determined via a data structure of mutually exclusive scenarios. Correlation application 153 is configured to communicate with vehicle server application 149, monitoring application 151, and/or DBMS 155 in order to obtain data for correlation analysis.

Storage 139 includes vehicle server application data 157, monitoring application data 159, correlation application data 161, and databases 163. Vehicle server application 149 generates and processes server application data 157 based on interaction with other components of computing infrastructure 100. To address requests of vehicle client system 105 or the plurality of vehicle sensors 175 and/to address abnormalities with respect to the plurality of vehicle sensors 175, vehicle server application 149 optionally sends such requests or aspects thereof to monitoring application 151 or correlation application 153. In an embodiment, monitoring application 151 sends database requests to DBMS 155 and processes results returned by DBMS 155 to generate monitoring application data 159. Moreover, monitoring application 151 may communicate directly with correlation application 153. In a further embodiment, correlation application 153 sends requests to DBMS 155 and processes results returned by DBMS 155 to generate correlation application data 161. DBMS 155 includes a software application configured to manage databases 163. In an embodiment, databases 163 include one or more relational databases. In an additional embodiment, databases 163 include one or more ontology trees or other ontological structures. While FIG. 1 illustrates three databases 163, vehicle server system 135 (and more generally computing infrastructure 100) may include any number of databases. According to a further embodiment, DBMS 155 sends requests to remote databases (not shown) via network 195, e.g., one or more databases associated with known errors system 185. In a further embodiment, vehicle server application 149 is communicatively coupled to a data structure of mutually exclusive scenarios. One or more aspects of the data structure of mutually exclusive scenarios optionally are operatively coupled to databases 163 and/or are operatively coupled to remote database(s) or other remote data structure(s).

I/O device interface 141 is communicatively coupled to one or more vehicle server I/O devices 165. CPU 143 is included to be representative of a single CPU, multiple CPUs, a single CPU having multiple processing cores, and the like. Server network interface 145 is configured to receive data from and transmit data to vehicle client system 105 or other client system(s) via network 195. Specifically, vehicle server application 149 is configured to accept requests sent by vehicle client system 105 or other client system(s) to vehicle server system 135 and is configured to transmit data to vehicle client system 105 or other client system(s) via server network interface 145. Furthermore, server network interface 145 is configured to receive data from and transmit data to the plurality of vehicle sensors 175, known errors system 185, and/or vehicle security system 190 via network 195.

The plurality of vehicle sensors 175 include analog sensors and/or digital sensors. The analog sensors may be based upon mechanical and/or magnetic assemblies. The digital sensors may be based upon electronic and/or magnetic assemblies. One or more sensors among the plurality of vehicle sensors 175 optionally include both analog and digital characteristics. In an embodiment, the plurality of vehicle sensors 175 include, inter alia, one or more of a speed sensor (e.g., a constituent component of a speedometer), a distance sensor (e.g., a constituent component of an odometer), an engine speed sensor (e.g., a constituent component of an tachometer), a global positioning system (GPS) sensor (e.g., a constituent component of a GPS navigation system), a camera sensor, a sound sensor, an altitude sensor (e.g., a constituent component of an altimeter), and a proximity sensor. The plurality of vehicle sensors 175 are hardware-based. For example, a GPS tracking sensor associated with a GPS navigation system includes an antenna configured to communicate with one or more GPS satellites. In another instance, a speed sensor included in a speedometer implementation includes a gear assembly linked to a transmission. In a further instance, a speed sensor included in a speedometer implementation includes a rotation sensor that delivers a series of electronic pulses corresponding to an average rotational speed of a driveshaft. In a further example, camera sensor(s) are linked to physical camera component(s) mounted on or under the vehicle. The plurality of vehicle sensors 175 optionally include software component(s) that interact with and/or enhance hardware component(s).

Known errors system 185 includes records with respect to vehicle parts of multiple vehicles, e.g., within a designated geographic area, corresponding to a specific vehicle make/type, having certain designated physical or functional characteristics, or associated with a manufacturer, dealer, or other service provider. In an embodiment, known errors system 185 includes or is otherwise communicatively coupled to one or more databases configured to store and process records that include vehicle part defect metadata. In an embodiment, known errors system 185 includes records with regard to inherent vehicle part defects. According to such embodiment, the vehicle part defect records include inherent manufacturing defect metadata, e.g., with respect to defect type, part number, hours of usage, usage patterns, vehicle service history (including service(s) applied and date of such service(s)), etc. Additionally or alternatively, known errors system 185 includes records with regard to erroneous assembly, maintenance, and/or installation of vehicle parts. According to such embodiment, the vehicle part defect records include metadata pertaining to erroneous assembly, maintenance, and/or installation of vehicle parts, e.g., with respect to affected vehicle part(s), maintenance location, maintenance dealer, maintenance date, maintenance type, vehicle type or make, etc.

Vehicle security system 190 includes security protocol information with regard to vehicle client system 105, vehicle server system 135, and/or the plurality of vehicle sensors 175. While vehicle security system 190 is shown as a separate entity of computing infrastructure 100 in FIG. 1, in an alternative embodiment vehicle security system 190 is located within vehicle server system 135 or is otherwise operatively coupled to vehicle server system 135.

Figure 2:
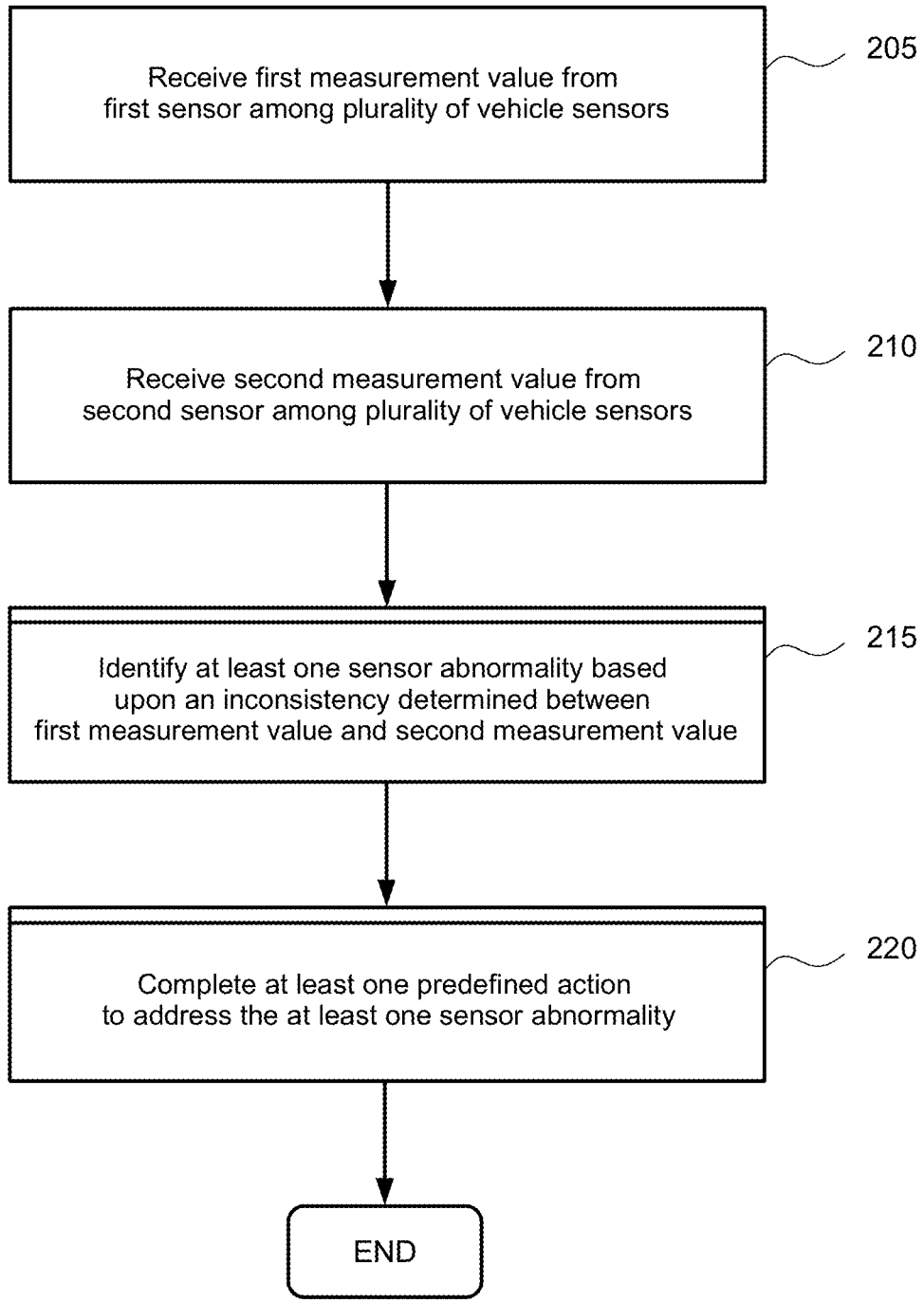
FIG. 2 illustrates a method of addressing at least one sensor abnormality associated with a vehicle, according to one or more embodiments.

FIG. 2 illustrates a method 200 of addressing at least one sensor abnormality associated with a vehicle, e.g., a partially or fully autonomous vehicle. One or more steps associated with the method 200 and the other methods described herein may be carried out in a client-server computing environment (e.g., computing infrastructure 100) including a network (e.g., network 195). A vehicle server application in a vehicle server system of the client-server computing environment (e.g., vehicle server application 149 in vehicle server system 135 of computing infrastructure 100) facilitates processing according to the method 200 and the other methods further described herein. The vehicle server application interacts with one or more clients associated with the vehicle via one or more vehicle client interfaces of a vehicle client system (e.g., vehicle client interface 121 of vehicle client system 105). The one or more clients include vehicle occupants (a driver or one or more passengers) and/or other parties associated with the vehicle (e.g., a party having partial or full remote/supervisory control of the vehicle). For instance, in a case in which a driver is present as well as a party having partial remote/supervisory control, the vehicle server application may interact with the driver via a vehicle client interface located within physical reach of the driver, and the vehicle server application further may interact with the party having partial remote/supervisory control via a vehicle client interface external to the vehicle (e.g., an interface of a remote desktop terminal or a mobile device interface). Additionally or alternatively to the client-server computing environment, one or more steps associated with the method 200 and the other methods described herein may be carried out within one or more workloads of a cloud computing environment associated with the vehicle. Additionally or alternatively, one or more steps associated with the method 200 and the other methods described herein may be carried out in a peer-to-peer network environment associated with the vehicle, in which case one or more of the method steps described herein may be carried out via a peer application of a peer computing system.

The method 200 begins at step 205, where the vehicle server application receives a first measurement value from a first sensor among a plurality of sensors associated with the vehicle (e.g., the plurality of vehicle sensors 175). According to step 205, the first sensor is at least partially responsive to periodic status requests sent by the vehicle server application or an application communicatively coupled therewith, such as a monitoring application associated with the vehicle server system (e.g., monitoring application 151) or a correlation application associated with the vehicle server system (e.g., correlation application 153). At step 210, the vehicle server application receives a second measurement value from a second sensor among the plurality of sensors. According to step 210, the second sensor is at least partially responsive to periodic status requests sent by the vehicle server application or an application communicatively coupled therewith.

At step 215, the vehicle server application identifies at least one sensor abnormality based upon an inconsistency determined between the first measurement value and the second measurement value. In an embodiment, the at least one sensor abnormality identified at step 215 results from at least one sensor defect, at least one vehicle security fault, or a combination thereof. In another embodiment, the vehicle server application identifies the at least one sensor abnormality in real time, i.e., immediately upon determining an inconsistency between the first measurement value and the second measurement value. Upon determining an inconsistency between the first measurement value and the second measurement value, the vehicle server application concludes that at least one sensor between the first sensor and the second sensor is malfunctioning and providing incorrect data even when both sensors are at least partially responsive to data requests. In a further embodiment, the vehicle server application updates correlation information associated with the vehicle based upon the at least one sensor abnormality identified at step 215. In a further embodiment, the vehicle server application periodically confirms proper correlation between the first sensor and the second sensor (as well as proper correlation between other sensors among the plurality of sensors), e.g., using resources of the correlation application, to determine any inconsistency. According to such further embodiment, the vehicle server application confirms proper sensor correlation by optionally receiving measurements in accordance with steps 205 and 210 at designated periodic intervals. Methods with regard to identifying the at least one sensor abnormality in accordance with step 215 are described with respect to FIG. 3 and FIG. 5.

At step 220, the vehicle server application completes at least one predefined action to address the at least one sensor abnormality. As further described herein, the vehicle server application optionally completes the at least one predefined action by generating and outputting one or more control signals associated with vehicle functionality. In an embodiment, the at least one predefined action includes at least one predefined safety measure, such as notifying the one or more clients associated with the vehicle of the at least one sensor abnormality via the one or more vehicle client interfaces. For instance, the vehicle server application may transmit and facilitate display of an urgent or emergency message on the one or more vehicle client interfaces. According to such embodiment, the vehicle server application optionally receives input from the one or more clients via the one or more vehicle client interfaces with respect to the at least one sensor abnormality (e.g., client observations or inquiries regarding any event(s) perceived as abnormal within the vehicle environment). In a further embodiment, the at least one predefined action includes transferring functionality of the sensor(s) affected by the at least one sensor abnormality to one or more other sensors among the plurality of sensors having a capability to effectively function on behalf of the affected sensor(s), e.g., temporarily transferring sensor functionality according to a sensor failover procedure. According to such embodiment, in the event that the vehicle includes multiple sensor types that are compatible, the vehicle server application may address a failure of one sensor type by temporarily transferring responsibility of the failed sensor type to another sensor type. Furthermore, according to such embodiment, in the event that the vehicle includes duplicate or standby sensors, the vehicle server application may address a failure of sensor(s) by temporarily transferring responsibility of the failed sensor(s) to duplicate or standby sensor(s). Methods with regard to completing the at least one predefined action in accordance with step 220 are described with respect to FIG. 7, FIG. 8, and FIG. 9.

Figure 3:
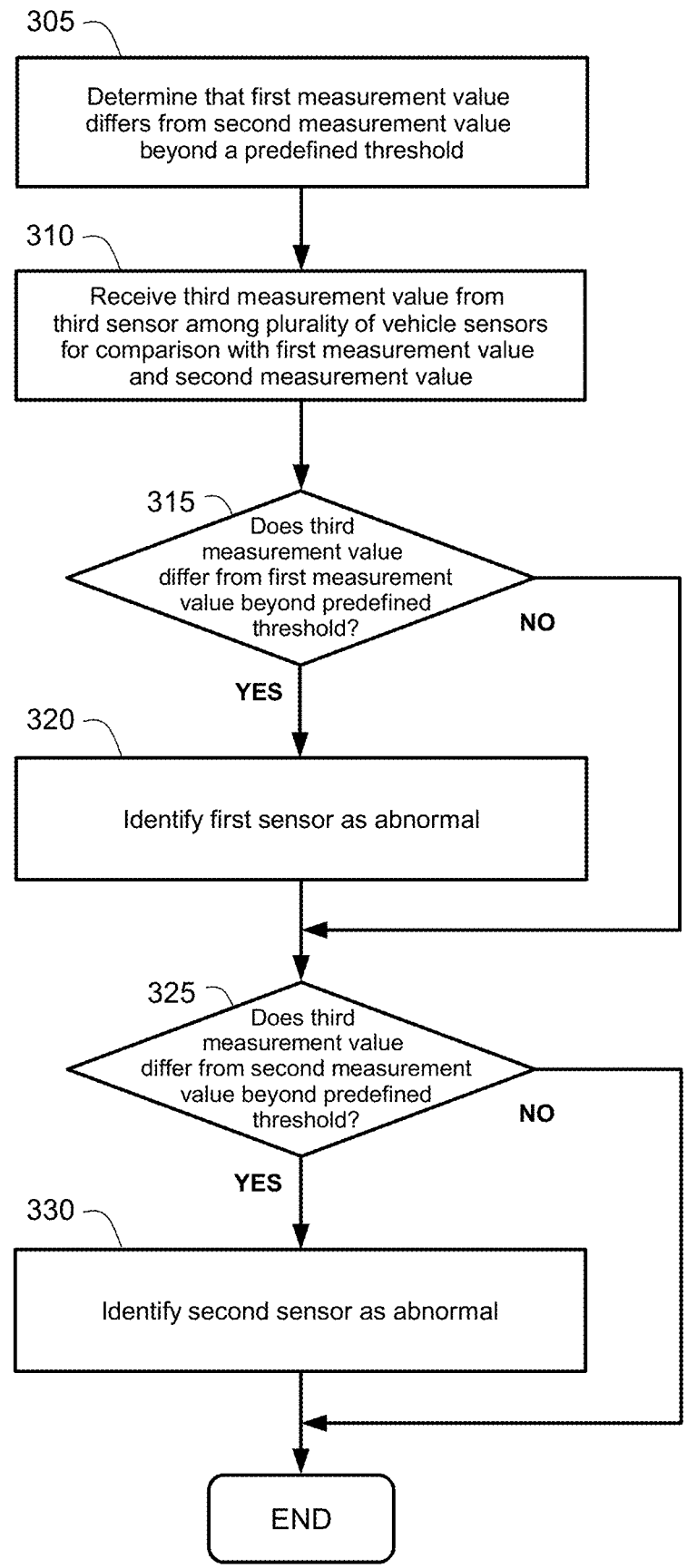
FIG. 3 illustrates a method of identifying at least one sensor abnormality associated with a vehicle, according to one or more embodiments.

FIG. 3 illustrates a method 300 of identifying the at least one sensor abnormality associated with the vehicle based upon an inconsistency determined between the first measurement value and the second measurement value. The method 300 provides one or more example embodiments with respect to step 215 of the method 200. According to one embodiment, the vehicle server application executes one or more steps of the method 300 responsive to determining that a vehicle metric measured by the first sensor is comparable to a vehicle metric measured by the second sensor. In the context of the method 300, a vehicle metric measured by the first sensor is comparable to a vehicle metric measured by the second sensor if the vehicle metric measured by the first sensor is synonymous with a vehicle metric measured by the second sensor. For instance, the vehicle server application may execute one or more steps of the method 300 in a scenario in which the first sensor is a speed sensor, the second sensor is a GPS tracking sensor, and the first sensor and the second sensor both are capable of measuring vehicle speed (i.e., the vehicle metric measured by both the first sensor and the second sensor is speed). Additionally, in the context of the method 300, a vehicle metric measured by the first sensor is comparable to a vehicle metric measured by the second sensor if the vehicle metric measured by the first sensor is compatible with a vehicle metric measured by the second sensor. More specifically, the vehicle server application may execute one or more steps of the method 300 in a scenario in which a vehicle metric measured by the first sensor is distinct from a vehicle metric measured by the second sensor, provided that the first measurement value and the second measurement value are compatible, e.g., such that the first measurement value and the second measurement value may be directly compared. For instance, the vehicle server application may execute one or more steps of the method 300 in a scenario in which the first sensor is a speed sensor that measures speed, the second sensor is a distance sensor that measures distance travelled, and the distance measurement from the second sensor can be converted to a speed measurement value based upon vehicle distance travelled over time such that it may be directly compared to the speed measurement value from the first sensor.

The method 300 begins at step 305, where the vehicle server application determines that the first measurement value differs from the second measurement value beyond a predefined threshold. In an embodiment, the vehicle server application determines that the first measurement value differs from the second measurement value beyond a predefined threshold by determining that the difference between the values exceeds a designated percentage. According to such embodiment, the vehicle server application optionally determines that the difference between the values exceeds a designated percentage based upon a percentage difference formula. The vehicle server application calculates the percentage difference per the percentage difference formula based upon the absolute value difference between the first measurement value and the second measurement value, divided by the average of the two values, all multiplied by 100. In a further embodiment, the vehicle server application periodically confirms proper correlation between the first sensor and the second sensor (as well as proper correlation between other sensors among the plurality of sensors having comparable vehicle metrics) based upon the predefined threshold.

At step 310, the vehicle server application receives a third measurement value from a third sensor among the plurality of sensors for comparison with the first measurement value and the second measurement value. Accordingly, in the context of the method 300, a vehicle metric measured by the third sensor is comparable to the vehicle metric(s) measured by the first sensor and the second sensor. In an embodiment, the vehicle server application initially verifies that the third sensor is functioning normally, e.g., via comparison of current data recorded for the third sensor with historical data recorded for the third sensor and/or via comparison of current data recorded for the third sensor with current data recorded for other sensors among the plurality of sensors. According to such embodiment, the vehicle server application optionally consults a database of previously recorded data including historical data with respect to the third sensor and/or a database of log data including real time data with respect to the third sensor. Such database of previously recorded data and/or such database of log data optionally are operatively coupled to the vehicle server system (e.g., included within databases 163) or alternatively are remote/cloud-based.

At step 315, the vehicle server application determines whether the third measurement value differs from the first measurement value beyond the predefined threshold. Responsive to determining that the third measurement value differs from the first measurement value beyond the predefined threshold, at step 320 the vehicle server application identifies the first sensor as abnormal. Responsive to determining that the third measurement value does not differ from the first measurement value beyond the predefined threshold, the vehicle server application proceeds directly to step 325 without identifying the first sensor as abnormal. At step 325, the vehicle server application determines whether the third measurement value differs from the second measurement value beyond the predefined threshold. Responsive to determining that the third measurement value differs from the second measurement value beyond the predefined threshold, at step 330 vehicle server application identifies the second sensor as abnormal. Responsive to determining that the third measurement value does not differ from the second measurement value beyond the predefined threshold, the vehicle server application proceeds directly to the end of the method 300 without identifying the second sensor as abnormal. The method 300 provides steps through which the vehicle server application identifies the at least one sensor abnormality based upon second order verification, as the third sensor assists with verification of an abnormality identified with respect to the first sensor and/or the second sensor.

In an embodiment, the vehicle server application optionally receives additional measurement value(s) from additional sensor(s) beyond the third sensor. According to such embodiment, the vehicle server application may compare such additional measurement value(s) with the first measurement value and the second measurement value in a similar or identical manner to the comparison of the third measurement value with the first measurement value and the second measurement value. According to such embodiment, the vehicle server application optionally receives additional measurement value(s) to further facilitate identification of at least one sensor abnormality in the context of the method 300, e.g., in a scenario in which the vehicle server application is unable to initially verify that the third sensor is functioning normally.

In a further embodiment, responsive to identifying the first sensor as abnormal at step 320 and identifying the second sensor as abnormal at step 330 (i.e., in a scenario in which both the first measurement value and the second measurement value differ from the third measurement value beyond the predefined threshold), the vehicle server application optionally addresses the at least one sensor abnormality according to step 220 by immediately facilitating total disablement of the vehicle, which may include notifying the one or more clients associated with the vehicle of a significant vehicle emergency. Facilitation of total disablement of the vehicle in order to address at least one sensor abnormality is further described herein with respect to FIG. 7.

Figure 4:
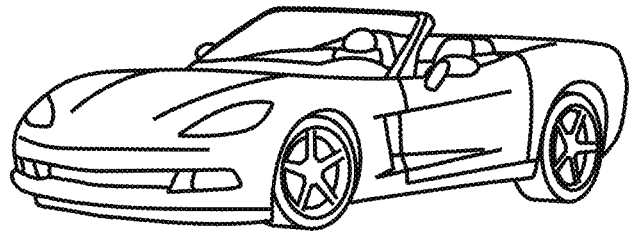
FIG. 4 illustrates an example scenario with respect to identifying at least one sensor abnormality.
Figure 4:
Figure 4:
Figure 4:
Figure 4:

FIG. 4 depicts an example scenario 400 with respect to identifying at least one sensor abnormality associated with a vehicle 405, e.g., an automobile, in the context of the methods 200 and 300. Scenario 400 is merely an example and is not intended to be limiting with respect to addressing sensor abnormalities as described herein. In the context of scenario 400, according to step 205 of the method 200, a vehicle server application of vehicle 405 receives a first measurement value from a first sensor 410 among a plurality of vehicle sensors. First sensor 410 is a speed sensor, e.g., a constituent component of a speedometer. According to step 210 of the method 200, the vehicle server application receives a second measurement value from a second sensor 420 among the plurality of vehicle sensors. Second sensor 420 is a GPS tracking sensor, e.g., a constituent component of a GPS navigation system, capable of measuring speed. According to step 215, the vehicle server application may identify at least one sensor abnormality based upon an inconsistency between the first measurement value and the second measurement value. Since the vehicle 405 metric measured by first sensor 410 is comparable to (and more specifically synonymous with) the vehicle 405 metric measured by second sensor 420, as both are capable of measuring speed, the vehicle server application may identify the at least one sensor abnormality in accordance with the method 300.

In the context of scenario 400, according to step 305 of the method 300, the vehicle server application of vehicle 405 determines that the first measurement value differs from the second measurement value beyond a predefined threshold. Specifically, assuming for purposes of scenario 400 that the first measurement value is a speed of 40 miles/hour and that the second measurement value is a speed of 60 miles/hour, and further assuming that the predefined threshold is 5%, the vehicle server application determines that the percentage difference between the first measurement value and the second measurement value is 40% based upon the percentage difference formula (beyond the predefined threshold). According to step 310 of the method 300, the vehicle server application receives a third measurement value from a third sensor 430 among the plurality of vehicle sensors. Third sensor 430 is a proximity sensor capable of measuring speed. The vehicle server application receives the third measurement value for comparison with the first measurement value and the second measurement value. It is assumed for purposes of scenario 400 that the vehicle server application independently verifies that third sensor 430 is functioning normally (and thus the vehicle server application may confirm that the comparison results with respect to third sensor 430 are reliable). According to step 315, the vehicle server application determines whether the third measurement value differs from the first measurement value beyond the predefined threshold. Assuming that the third measurement value is a speed of 42 miles/hour, the vehicle server application determines that the percentage difference between the third measurement value and the first measurement value is ~4.878% based upon the percentage difference formula, which is not beyond the predefined threshold of 5%. Responsive to determining that the third measurement value does not differ from the first measurement value beyond the predefined threshold, the vehicle server application proceeds directly to step 325 without identifying first sensor 410 as abnormal. According to step 325, the vehicle server application determines whether the third measurement value differs from the second measurement value beyond the predefined threshold. The vehicle server application determines that the percentage difference between the third measurement value and the second measurement value is ~35.294% based upon the percentage difference formula, which is beyond the predefined threshold of 5%. Responsive to determining that the third measurement value differs from the second measurement value beyond the predefined threshold, according to step 330 the vehicle server application identifies second sensor 420 as abnormal.

Figure 5:
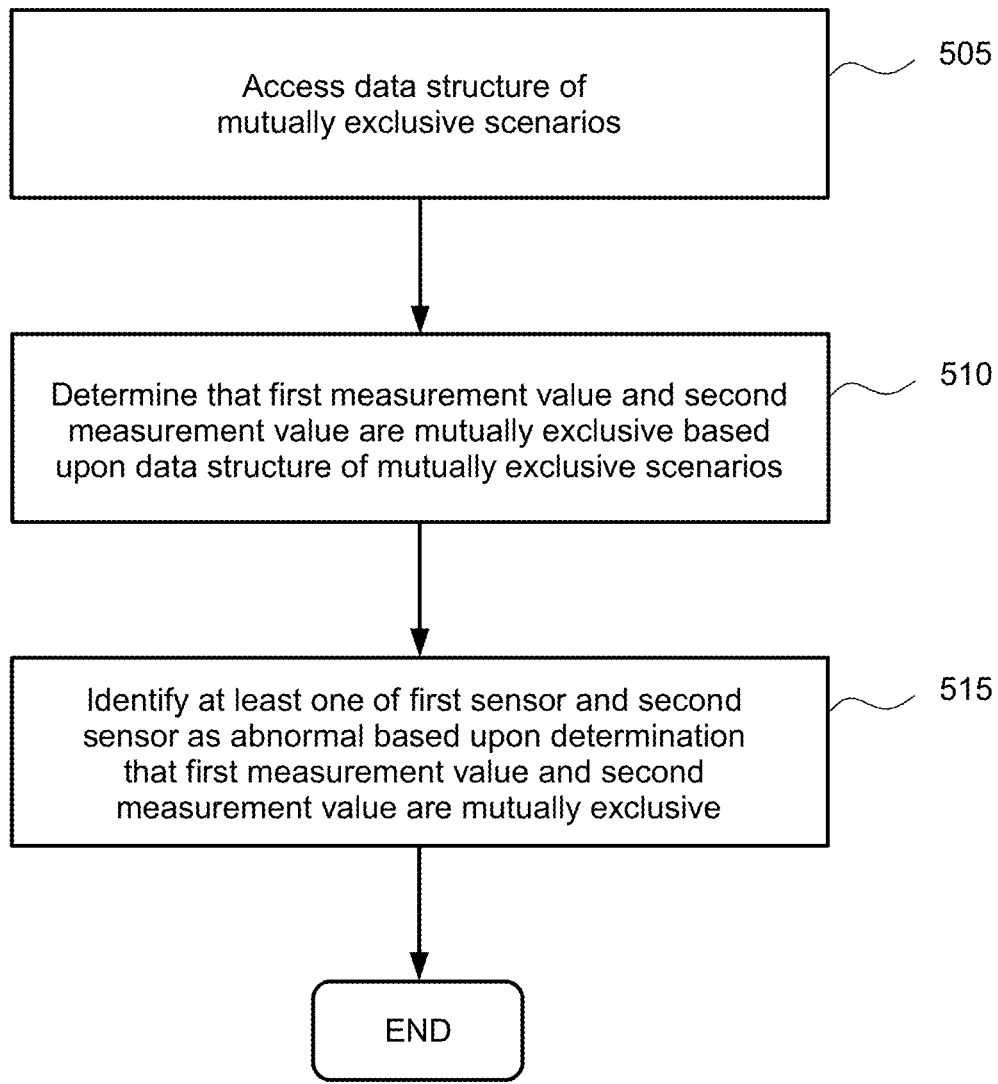
FIG. 5 illustrates a method of identifying at least one sensor abnormality associated with a vehicle, according to one or more further embodiments.

FIG. 5 illustrates a method 500 of identifying the at least one sensor abnormality associated with the vehicle based upon an inconsistency determined between the first measurement value and the second measurement value. The method 500 provides one or more further example embodiments with respect to step 215 of the method 200. According to one embodiment, the vehicle server application executes one or more steps of the method 500 responsive to determining that a vehicle metric measured by the first sensor is distinct from a vehicle metric measured by the second sensor. For instance, the vehicle server application may execute one or more steps of the method 500 in a scenario in which the first sensor is a speed sensor, the first sensor is capable of measuring vehicle speed, the second sensor is a proximity sensor, and the second sensor is capable of measuring/determining vehicle proximity to road obstacles (i.e., the vehicle metric measured by the first sensor is speed, but the vehicle metric measured by the second sensor is proximity). The method 500 begins at step 505, where the vehicle server application accesses (i.e., consults) a data structure of mutually exclusive scenarios. The vehicle server application may access and otherwise interface with the data structure of mutually exclusive scenarios through a cloud service via the network. Such cloud service may provide updates with respect to mutually exclusive scenarios based upon sensor data collected from the vehicle as well as other vehicles. Some or all aspects of the data structure of mutually exclusive scenarios may be stored within the vehicle server system. The data structure of mutually exclusive scenarios includes a representation (e.g., a listing) of incompatible vehicle metrics, i.e., vehicle metrics that are contradictory and thus cannot occur simultaneously. In an embodiment, the data structure includes one or more matrices or tables. Additionally or alternatively, the data structure includes or is otherwise associated with one or more databases.

At step 510, the vehicle server application determines that the first measurement value and the second measurement value are mutually exclusive based upon the data structure of mutually exclusive scenarios. At step 515, the vehicle server application identifies at least one of the first sensor and the second sensor as abnormal based upon the determination that the first measurement value and the second measurement value are mutually exclusive. For instance, responsive to determining that the first sensor measures a vehicle speed of 80 miles per hour but the second sensor measures no change in proximity to a road obstacle, i.e., responsive to determining per the data structure of mutually exclusive scenarios that the first measurement value with respect to vehicle speed and the second measurement value with respect to vehicle proximity are contradictory/cannot occur simultaneously and thus are mutually exclusive, the vehicle server application identifies the first sensor and/or the second sensor as abnormal. In an embodiment, the vehicle server application immediately identifies the first sensor or the second sensor as abnormal upon determining that the first measurement value or the second measurement value is impossible given a current state of the vehicle or given inherent characteristics/capabilities of the vehicle. For instance, in the aforementioned example with respect to the first sensor measuring speed and the second sensor measuring proximity, assuming that the vehicle server application determines the vehicle to be in motion within a given timeframe in which the second sensor measures proximity, the vehicle server application immediately may identify the second sensor as abnormal assuming that the second sensor measures no change in proximity within the given timeframe despite the vehicle being in motion. The method 500 provides steps through which the vehicle server application identifies the at least one sensor abnormality based upon second order verification, as the data structure of mutually exclusive scenarios assists with verification of an abnormality identified with respect to the first sensor and/or the second sensor.

In a further embodiment, the vehicle server application identifies at least one of the first sensor and the second sensor as abnormal through an additional form of second order verification. According to such further embodiment, in the event that the first measurement value is comparable to (i.e., compatible with) the second measurement value, the vehicle server application may introduce a third sensor measurement comparable to the first measurement value and the second measurement value in accordance with the method 300. For instance, in the aforementioned example with respect to the first sensor measuring speed and the second sensor measuring proximity, in the event that the proximity value is comparable to the speed value (e.g., by converting the proximity value to a speed value), the vehicle server application may receive a third measurement value from a third sensor (e.g., a camera sensor) measuring vehicle speed in an attempt to determine whether the first measurement value and/or the second measurement value differs from the third measurement value beyond a predefined threshold on the basis of vehicle speed. Additionally or alternatively, according to such further embodiment, in the event that there is a third measurement value from a third sensor that may be analyzed in the context of the data structure of mutually exclusive scenarios, the vehicle server application may utilize such third measurement value to determine whether there is a clear outlier measurement value among the first measurement value, the second measurement value, and the third measurement value such that one of the three measurement values is unequivocally inconsistent with the other two measurement values.

In a further embodiment, responsive to determining that no sensor is immediately identifiable as abnormal and further that no form of second order verification is available upon determining that the first measurement value and the second measurement value are mutually exclusive (i.e., consequent to determining that there is at least one vehicle abnormality that cannot be readily diagnosed), the vehicle server application optionally addresses the at least one sensor abnormality according to step 220 by immediately facilitating total disablement of the vehicle, which may include notifying the one or more clients associated with the vehicle of a significant vehicle emergency. Facilitation of total disablement of the vehicle in order to address at least one sensor abnormality is further described herein with respect to FIG. 7.

Figure 6:
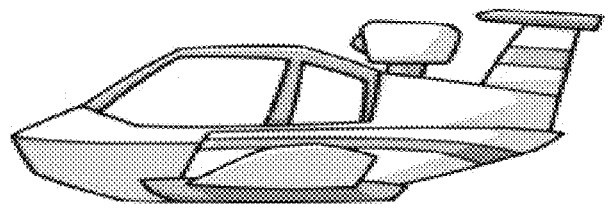
FIG. 6 illustrates a further example scenario with respect to identifying at least one sensor abnormality.
Figure 6:
Figure 6:
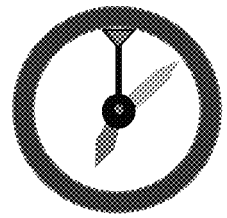
Figure 6:
Figure 6:
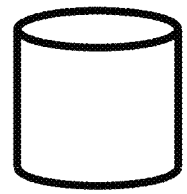

FIG. 6 depicts an example scenario 600 with respect to identifying at least one sensor abnormality associated with a vehicle 605, e.g., a ground-effect vehicle, in the context of the methods 200 and 500. Scenario 600 is merely an example and is not intended to be limiting with respect to addressing sensor abnormalities as described herein. In the context of scenario 600, according to step 205 of the method 200, a vehicle server application of vehicle 605 receives a first measurement value from a first sensor 610 among a plurality of vehicle sensors. First sensor 610 is a speed sensor, e.g., a constituent component of a speedometer. According to step 210 of the method 200, the vehicle server application receives a second measurement value from a second sensor 620 among the plurality of vehicle sensors. Second sensor 620 is an altitude sensor capable of measuring vehicle altitude, e.g., a constituent component of an altimeter. According to step 215 the vehicle server application may identify at least one sensor abnormality based upon an inconsistency between the first measurement value and the second measurement value. Since the vehicle 605 metric measured by first sensor 610 is distinct from the vehicle 605 metric measured by second sensor 620, as the first sensor measures speed and the second sensor measures altitude, the vehicle server application may identify the at least one sensor abnormality in accordance with the method 500.

In the context of scenario 600, according to step 505 of the method 500, the vehicle server application of vehicle 605 accesses a database of mutually exclusive scenarios 630, e.g., a cloud-based database including information pertaining to functionality of contemporary ground-effect vehicles. Assuming that first sensor 610 measures a vehicle speed of 40 kilometers/hour and that second sensor 620 measures an altitude of 100 meters, and assuming that the database of mutually exclusive scenarios 630 includes entries with respect to speed and altitude capabilities of contemporary ground-effect vehicles, according to step 510 the vehicle server application may determine that the first measurement value and the second measurement value are mutually exclusive based upon the database of mutually exclusive scenarios 630, since a contemporary ground-effect vehicle could not cruise at such altitude given the speed. According to step 515, the vehicle server application identifies at least one of first sensor 610 and second sensor 620 as abnormal based upon the determination that the first measurement value and the second measurement value are mutually exclusive. In this instance, the vehicle server application immediately may identify second sensor 620 as abnormal, since the second measurement value of 100 meters altitude is impossible since a contemporary ground-level vehicle must stay within a certain distance to the ground in order to effectively function. In order to determine whether first sensor 610 also is abnormal, optionally the vehicle server application may utilize an additional form of second order verification in accordance with portions of the method 300, e.g., by receiving a third measurement value via a third sensor of vehicle 605 verified as functioning normally and then determining whether the first measurement value differs from the third measurement value beyond a predefined threshold.

Figure 7:
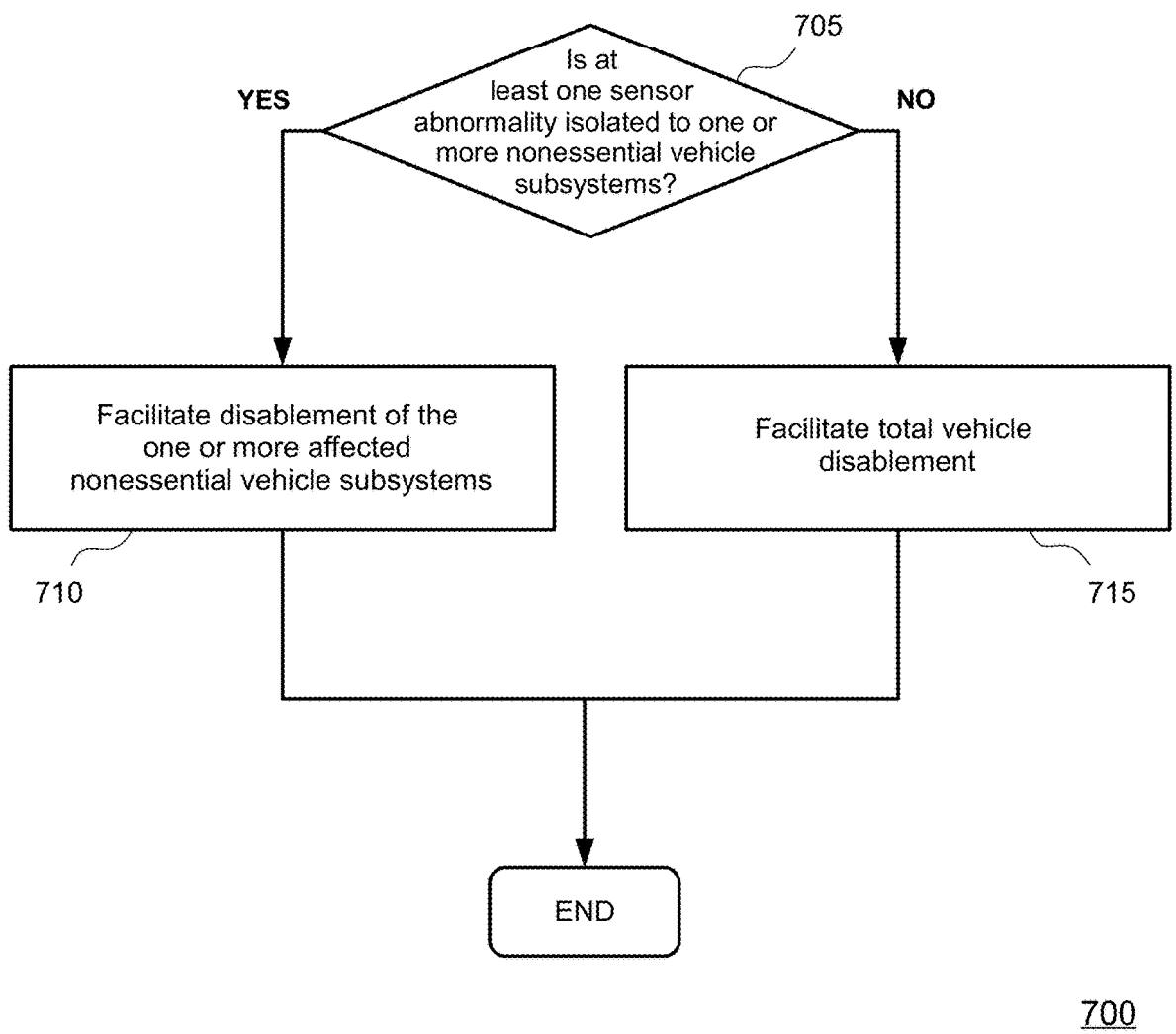
FIG. 7 illustrates a method of completing at least one predefined action to address at least one sensor abnormality associated with a vehicle, according to one or more embodiments.

FIG. 7 illustrates a method 700 of completing the at least one predefined action to address the at least one sensor abnormality. The method 700 provides one or more example embodiments with respect to step 220 of the method 200.

The method 700 begins at step 705, where the vehicle server application determines whether the at least one sensor abnormality is isolated to one or more nonessential vehicle subsystems. Responsive to determining that the at least one sensor abnormality is isolated to one or more nonessential vehicle subsystems (i.e., responsive to determining that the at least one sensor abnormality does not affect the overall safety or functionality of the vehicle but rather only affects one or more nonessential vehicle subsystems), at step 710 the vehicle server application facilitates disablement of the one or more affected nonessential vehicle subsystems. For instance, if the at least one sensor abnormality is isolated to an interior climate control subsystem of the vehicle, the vehicle server application may facilitate disablement of the interior climate control subsystem only, i.e., without total disablement of the vehicle server system and without disabling other vehicle subsystems. In an embodiment, the vehicle server application facilitates disablement of the one or more affected nonessential vehicle subsystems by generating a control signal to disable the one or more affected nonessential vehicle subsystems and outputting the control signal to the one or more nonessential vehicle subsystems. According to such embodiment, the vehicle server application optionally may generate and submit a notification signal to other vehicle subsystems with respect to the disablement of the one or more affected nonessential vehicle subsystems. In a further embodiment, the vehicle server application notifies the one or more clients associated with the vehicle of the disablement at step 710 by relaying a message to the one or more clients via the one or more vehicle client interfaces (e.g., through relay of an audio-based and/or a video-based disablement notification).

In an embodiment, the vehicle server application facilitates disablement of the one or more nonessential vehicle subsystems affected by the at least one sensor abnormality by initiating a failover routine. According to a failover routine, the vehicle server application transfers control of the one or more affected nonessential vehicle subsystems to one or more duplicate or standby vehicle subsystems and/or to one or more already functioning vehicle subsystems having a capability to assume temporary responsibility for functionality of the one or more affected nonessential vehicle subsystems. In a further embodiment, according to a failover routine, the vehicle server application transfers functionality of the one or more sensors among the plurality of sensors affected by the at least one sensor abnormality to one or more duplicate or standby sensors among the plurality of sensors having a capability to assume temporary responsibility for functionality of the one or more affected sensors. Additionally or alternatively, according to a failover routine, the vehicle server application transfers functionality of the one or more affected sensors to one or more sensors of a different but compatible type having a capability to assume temporary responsibility for functionality of the one or more affected sensors. The vehicle server application proceeds to the end of the method 700 upon executing step 710.

Responsive to determining at step 705 that the at least one sensor abnormality is not isolated to one or more nonessential vehicle subsystems, i.e., responsive to determining that the at least one sensor abnormality affects the overall safety or functionality of the vehicle, the vehicle server application proceeds to step 715, where the vehicle server application facilitates total disablement of the vehicle. In an embodiment, according to step 715, the vehicle server application facilitates total disablement in part by notifying the one or more clients associated with the vehicle of a significant vehicle emergency via the one or more vehicle client interfaces. According to such embodiment, the vehicle emergency notification may include one or more audio warnings and/or one or more video warnings. In a further embodiment, according to step 715, responsive to determining that the vehicle is positioned such that the vehicle cannot be disabled immediately without introducing further safety risks, e.g., in the event that the vehicle is positioned in the middle of the road and/or among traffic, the vehicle server application is configured to facilitate guidance of the vehicle to a safe stationary location and/or position prior to total disablement. In a further embodiment, the vehicle server application facilitates total disablement of the vehicle by generating a control signal to disable the central control system of the vehicle and outputting the control signal to the central control system. The vehicle server application proceeds to the end of the method 700 upon executing step 715.

In an alternative embodiment, the vehicle server application executes steps of the method 700 in inverted order. According to such alternative embodiment, at step 705 the vehicle server application determines whether the at least one sensor abnormality affects the overall safety or functionality of the vehicle, in which case step 715 is executed responsive to determining that the overall safety or functionality of the vehicle is affected and conversely step 710 is executed upon determining that overall safety or functionality of the vehicle is not affected (i.e., upon determining that the at least one sensor abnormality is isolated to one or more nonessential vehicle subsystems). In a further alternative embodiment, the vehicle server application executes only aspects of the method 700 pertaining to one or more nonessential vehicle subsystems. In a further alternative embodiment, the vehicle server application executes only aspects of the method 700 pertaining to overall safety or functionality of the vehicle.

Figure 8:
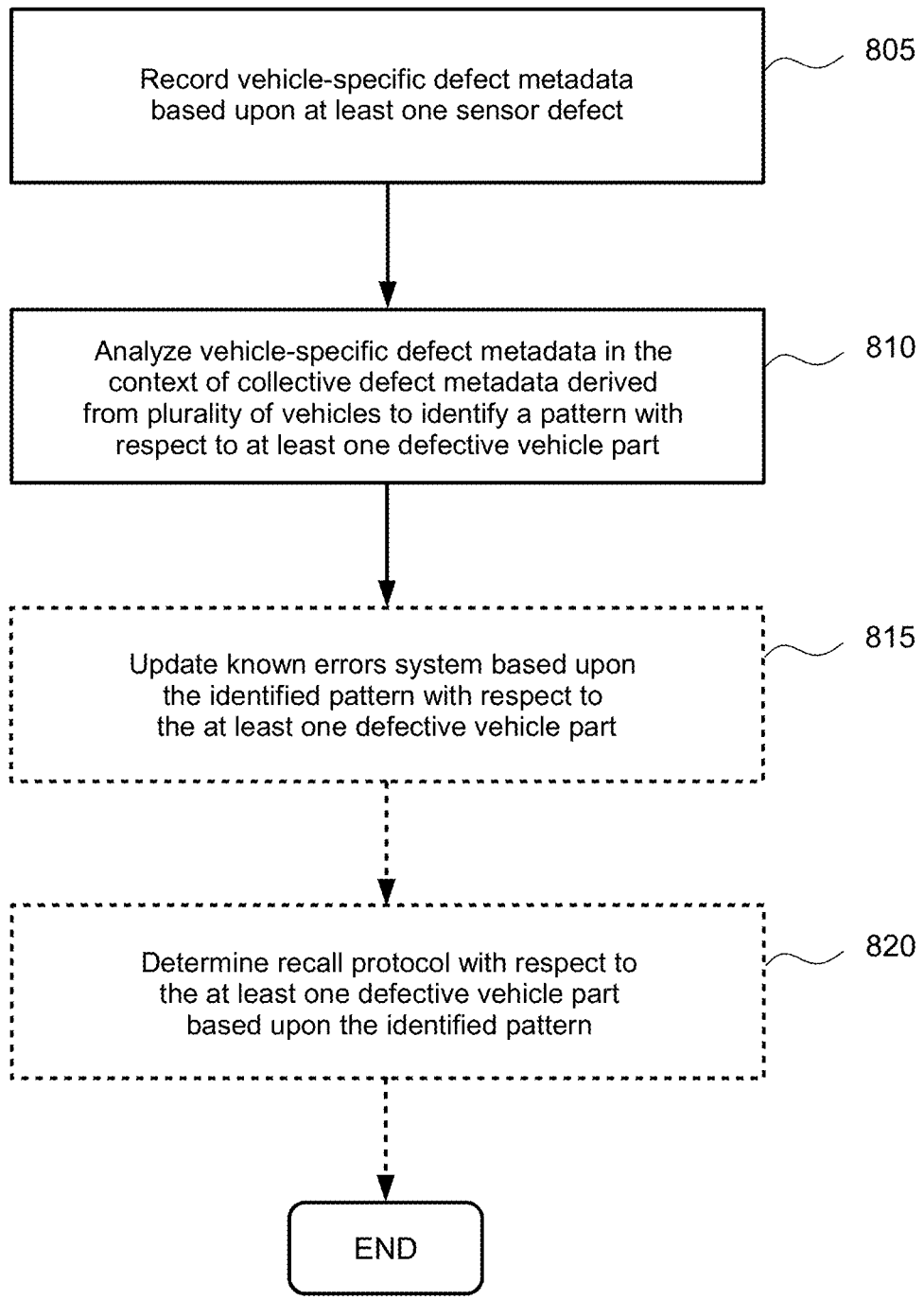
FIG. 8 illustrates a method of completing at least one predefined action to address at least one sensor abnormality associated with a vehicle, according to one or more further embodiments.

FIG. 8 illustrates a method 800 of completing the at least one predefined action to address the at least one sensor abnormality. The method 800 provides one or more further example embodiments with respect to step 220 of the method 200. According to one embodiment, the vehicle server application executes one or more steps of the method 800 responsive to determining that the at least one sensor abnormality results from at least one sensor defect. Such at least one sensor defect may be indicative of one or more defective vehicle parts, e.g., vehicle part(s) with an inherent manufacturing defect or vehicle part(s) incorrectly assembled/installed/maintained. The method 800 begins at step 805, where the vehicle server application records vehicle-specific defect metadata based upon the at least one sensor defect. In an embodiment, the vehicle-specific metadata includes inherent manufacturing defect metadata, e.g., defect type, part number, hours of usage, usage patterns, vehicle service history (including service(s) applied and date of such service(s)), etc. Additionally or alternatively, the vehicle-specific metadata includes metadata pertaining to erroneous assembly, maintenance, and/or installation of vehicle parts, e.g., affected vehicle part(s), maintenance location(s), maintenance dealer(s), maintenance date(s), maintenance type, vehicle type or make, etc.

At step 810, the vehicle server application analyzes the vehicle-specific defect metadata in the context of collective defect metadata derived from a plurality of vehicles to identify a pattern with respect to at least one defective vehicle part. The collective defect metadata may include defect metadata from multiple vehicles that is analogous to the vehicle-specific defect metadata, i.e., comparable to the vehicle-specific defect metadata. In an embodiment, the collective defect metadata is stored in a defective vehicle part database. According to such embodiment, the vehicle server application optionally receives periodic and/or on-demand updates with respect to the defective vehicle part database by subscribing to a cloud based service. In an embodiment, both the vehicle-specific metadata and the collective defect metadata incorporate inherent manufacturing defect metadata. Additionally or alternatively, both the vehicle-specific metadata and the collective defect metadata incorporate metadata pertaining to erroneous assembly, maintenance, and/or installation of vehicle parts.

In an embodiment, by identifying the pattern according to step 810, the vehicle server application determines a common factor affecting at least one defective vehicle part. For instance, according to such embodiment, the vehicle server application identifies a pattern with respect to common use of a certain defective vehicle part in certain environmental conditions (e.g., weather/altitude). In another instance, according to such embodiment, the vehicle server application identifies a pattern of common use of a certain vehicle part manufacturer for design or fabrication of a certain defective vehicle part. In another instance, according to such embodiment, the vehicle server application identifies a pattern with respect to common use of a certain service provider (e.g., vehicle dealer or automotive shop) for installation or maintenance of a certain defective vehicle part. Pattern identification according to step 810 may contribute to a root cause analysis process with respect to the at least one defective vehicle part such that the vehicle server application may facilitate a solution to address the defect itself, e.g., by facilitating a recall as further described herein, in addition to addressing symptoms of such defect through vehicle part disablement.

In an embodiment, the vehicle server application identifies the pattern with respect to the at least one defective vehicle part at step 810 by calculating a similarity factor with respect to analogous vehicle sensors of multiple vehicles that are associated with the at least one defective vehicle part. In the context of the various embodiments described herein, analogous vehicle sensors are vehicle sensors that produce comparable results. The vehicle server application optionally selects the multiple vehicles in this context among the vehicle from which the vehicle-specific defect metadata is recorded and the plurality of vehicles from which the collective defect metadata is derived. According to such embodiment, the similarity factor is calculated as a ratio of a total number of metadata matches found among analogous vehicle sensors to a total number of possible metadata matches based upon a comparison of metadata aspects of the analogous vehicle sensors. Moreover, according to such embodiment, the metadata used to calculate the similarity factor may include both the vehicle-specific defect metadata analyzed in the context of the at least one sensor defect and the collective defect metadata. Such calculation results in a similarity factor value between 0 and 1. A similarity factor value closer to 0 indicates relatively lower similarity, while a similarity factor value closer to 1 indicates relatively higher similarity. Additionally, according to such embodiment, a similarity factor ratio is computed for each pair of analogous vehicle sensors such that respective pairs of vehicle sensors having a similarity factor above a designated similarity threshold are grouped together in the context of identifying the pattern with respect to the at least one defective vehicle part. For instance, for a given pair of analogous vehicle sensors, assuming that there are four metadata matches between the sensors out of ten compared aspects (i.e., possible metadata matches), the vehicle server application may calculate the similarity factor for such pair as a ratio of 4/10, or 0.4. Assuming that the designated similarity threshold is 0.5, such pair would not be grouped together in the context of identifying the pattern. Additionally or alternatively, according to such embodiment, a similarity factor ratio is computed for each cluster of analogous vehicle sensors (a cluster including multiple analogous vehicle sensors, optionally more than two) such that respective clusters of vehicle sensors having a similarity factor above a designated threshold are grouped together in the context of identifying the pattern with respect to the at least one defective vehicle part. For instance, for a given cluster of analogous vehicle sensors, assuming that there are fifteen metadata matches among the sensors out of twenty compared aspects (i.e., possible metadata matches), the vehicle server application may calculate the similarity factor for such cluster as a ratio of 15/20, or 0.75. Assuming that the designated similarity threshold is 0.5, such cluster would be grouped together in the context of identifying the pattern. By grouping together pairs or clusters of analogous vehicle sensors of multiple vehicles associated with the at least one defective vehicle part based upon similarity factor calculations, the vehicle server application may identify the pattern according to step 810 in order to determine a common factor affecting the at least one defective vehicle part. Furthermore, similarity factor calculations enable the vehicle server application to create a quantitative weighting metric in order to measure level of similarity between two defective vehicle sensors or among multiple defective vehicle sensors.

Optionally, at step 815 the vehicle server application updates a known errors system (e.g., known errors system 185) based upon the identified pattern with respect to the at least one defective vehicle part, i.e., by associating the identified pattern with the at least one defective vehicle part. The known errors system includes records of inherent manufacturing defects and/or erroneous assembly, maintenance, and/or installation of vehicle parts. In an embodiment, the vehicle server application optionally receives periodic updates with respect to the known errors system by subscribing to a cloud based or network service. According to the aforementioned embodiment in which the collective defect metadata is stored in a defective vehicle part database, the defective vehicle part database optionally is located within the known errors system or is otherwise communicatively or operatively coupled to the known errors system. In a further embodiment, based upon analysis of the vehicle-specific defect metadata in the context of collective defect metadata in the defective vehicle part database, the vehicle server application updates an already existing pattern within the known errors system. Additionally or alternatively, based upon such analysis of the vehicle-specific defect metadata, the vehicle server application adds new a pattern to the known errors system. According to such embodiments, the vehicle server application updates the known errors system based upon any information with regard to the vehicle-specific metadata as well as any contextual information related to the vehicle. For instance, the vehicle server application updates the known errors system with details with respect to the at least one defect associated with the vehicle as well as any details with regard to physical or functional characteristics of the vehicle affected by the at least one defect. Additionally or alternatively, the vehicle server application updates the known errors system with any information regarding a determined common factor affecting the at least one defective vehicle part.

For example, according to steps 805 and 810, assuming that an identified sensor abnormality associated with the vehicle is a defect pertaining to a temperature sensor resulting in inaccurate measurement tendencies in environmental conditions involving high altitude and frigid temperature, the vehicle server application may record vehicle-specific metadata with respect to the temperature sensor and may analyze the vehicle-specific metadata in the context of collective defect metadata from analogous temperature sensor(s) of one or more other vehicles displaying similar inaccurate measurement tendencies. Assuming that the temperature sensor of the vehicle is associated with a certain thermometer model and that similarly the analogous temperature sensor(s) of the one or more other vehicles also are associated with the thermometer model, the vehicle server application may identify a pattern with respect to the thermometer model. The vehicle server application may identify the thermometer model pattern according to the example by calculating a similarity factor with respect to analogous temperature sensors associated with the thermometer model. Specifically, a similarity factor calculated with respect to the temperature sensor of the vehicle and analogous temperature sensor(s) of the one or more other vehicles may be relatively high, e.g., above a designated threshold such that the temperature sensors are grouped together. In this example, in the context of calculating a similarity factor with respect to the analogous temperature sensors, there may be a relatively high number of matching metadata aspects with regard to thermometer measurements and other measurements of environmental conditions, particularly with respect to conditions of high altitude and frigid temperature. Consequently, according to step 815 the vehicle server application may update the known errors system based upon the identified thermometer model pattern and may add information based upon common use of the thermometer model in environmental conditions involving high altitude and frigid temperature.

In another example, according to steps 805 and 810, assuming that an identified sensor abnormality associated with the vehicle is a defect pertaining to a GPS tracking sensor resulting in inaccurate measurement tendencies, the vehicle server application may record vehicle-specific metadata with respect to the GPS tracking sensor and may analyze the vehicle-specific metadata in the context of collective defect metadata from analogous GPS tracking sensor(s) of one or more other vehicles displaying similar inaccurate measurement tendencies. Assuming that the GPS tracking sensor of the vehicle is associated with a certain vehicle navigation system installed by a certain manufacturer and that similarly the analogous GPS tracking sensor(s) of the one or more other vehicles also are associated with the same vehicle navigation system installed by the same manufacturer, the vehicle server application may identify a pattern with respect to the vehicle navigation system. The vehicle server application may identify the vehicle navigation system pattern according to the example by calculating a similarity factor with respect to analogous GPS tracking sensors associated with the vehicle navigation system. Specifically, a similarity factor calculated with respect to the GPS tracking sensor of the vehicle and analogous GPS tracking sensor(s) of the one or more other vehicles may be relatively high, e.g., above a designated threshold such that the GPS tracking sensors are grouped together. In this example, in the context of calculating a similarity factor with respect to the analogous GPS tracking sensors, there may be a relatively high number of matching metadata aspects with regard to navigation system characteristics. Consequently, according to step 815 the vehicle server application may update the known errors system based upon the identified vehicle navigation system pattern and may add information based upon common use of the certain manufacturer for design or fabrication of the vehicle navigation system.

In a further example, according to steps 805 and 810, assuming that an identified sensor abnormality associated with the vehicle is a defect pertaining to an audio sensor resulting in inaccurate measurement tendencies, the vehicle server application may record vehicle-specific metadata with respect to the audio sensor and may analyze the vehicle-specific metadata in the context of collective defect metadata from analogous audio sensor(s) of one or more other vehicles displaying similar inaccurate measurement tendencies. Assuming that the audio sensor of the vehicle is associated with a certain voice recorder maintained or otherwise serviced by a certain dealer and that similarly the analogous audio sensor(s) of the one or more other vehicles also are associated with the same voice recorder serviced by the same dealer, the vehicle server application may identify a pattern with respect to the voice recorder. The vehicle server application may identify the voice recorder pattern according to the example by calculating a similarity factor with respect to analogous audio sensors associated with the voice recorder. Specifically, a similarity factor calculated with respect to the audio sensor of the vehicle and analogous audio sensor(s) of the one or more other vehicles may be relatively high, e.g., above a designated threshold such that the audio sensors are grouped together. In this example, in the context of calculating a similarity factor with respect to the analogous audio sensors, there may be a relatively high number of matching metadata aspects with regard to voice recorder characteristics. Consequently, according to step 815 the vehicle server application may update the known errors system based upon the identified voice recorder pattern and may add information based upon common use of the certain dealer for maintenance or service of the voice recorder.

Optionally, at step 820 the vehicle server application determines a recall protocol with respect to the at least one defective vehicle part based upon the identified pattern. In an embodiment, a group of vehicles identified for recall includes any vehicle having one or more sensors affected by the at least one sensor defect, regardless of origin, make, or model. According to such embodiment, a vehicle recall is based upon the at least one sensor defect rather than vehicle make or type. In an alternative embodiment, a group of vehicles identified for recall includes any vehicle make or type associated with the at least one sensor defect within the known errors system. In a further alternative embodiment, a group of vehicles identified for recall incudes any vehicle make or type associated with a manufacturer or a service provider that is connected to a threshold number of defects within a certain period of time. Optionally the vehicle server application facilitates overall vehicle disablement or vehicle subsystem disablement in accordance with one or more steps of the method 700 in addition to determining the recall protocol.

Figure 9:
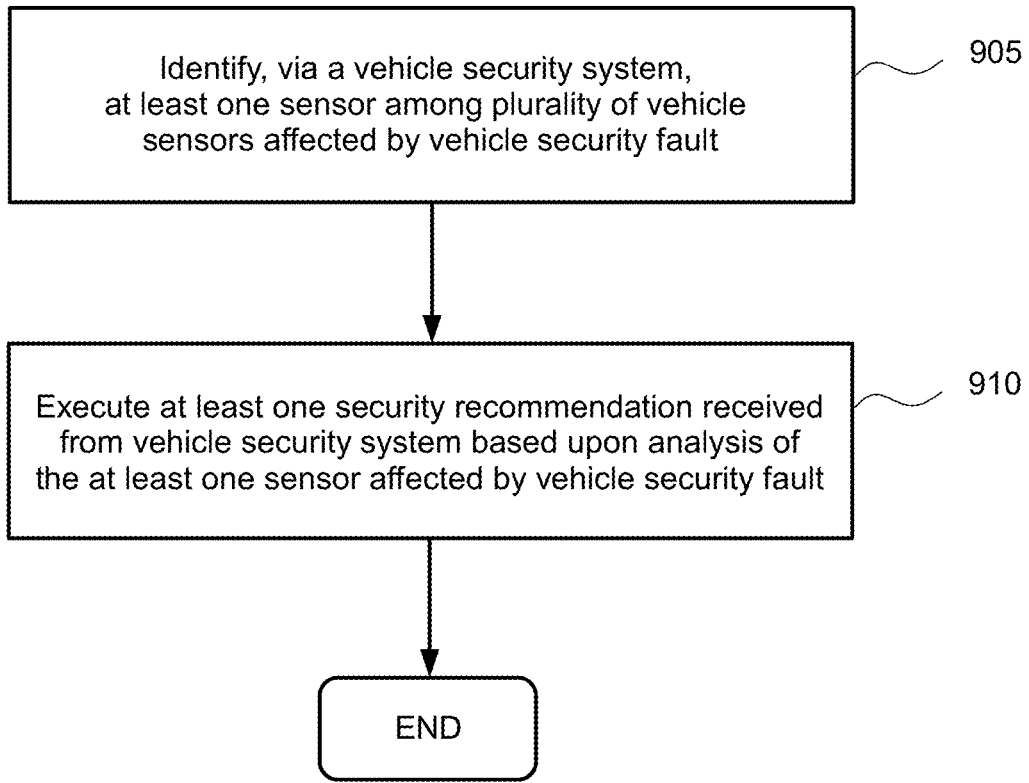
FIG. 9 illustrates a method of completing at least one predefined action to address at least one sensor abnormality associated with a vehicle, according to one or more further embodiments.

FIG. 9 illustrates a method 900 of completing the at least one predefined action to address the at least one sensor abnormality. The method 900 provides one or more further example embodiments with respect to step 220 of the method 200. According to one embodiment, the vehicle server application executes one or more steps of the method 900 responsive to determining that the at least one sensor abnormality results from a vehicle security fault, e.g., a fault arising from a security breach compromising autonomous vehicle activity. The method 900 begins at step 905, where the vehicle server application identifies, via a security system associated with the vehicle (e.g., vehicle security system 190), at least one sensor among the plurality of sensors compromised by the vehicle security fault. In an embodiment, the security system is included as a component of the vehicle server system or is otherwise communicatively or operatively coupled to the vehicle, e.g., via a cloud-based security system. In a further embodiment, the vehicle server application via the security system detects the vehicle security fault based upon a protocol breach in a sensor authentication process periodically initiated by the security system. For instance, the vehicle server application may detect a failure of encrypted communication between the security system and at least one sensor among the plurality of sensors.

At step 910, the vehicle server application executes at least one security recommendation received from the security system based upon analysis of the at least one sensor affected by the vehicle security fault. In an embodiment, the at least one security recommendation includes a recommendation to contact a manufacturer and/or a service provider associated with the vehicle in order to relay relevant security fault metadata. In a further embodiment, the at least one security recommendation includes a recommendation to disable some or all functional capabilities of the vehicle. According to such further embodiment, the at least one security recommendation includes a recommendation to disable all functional capabilities of the vehicle (including disablement of vehicle startup) responsive to determining that the vehicle security fault impacts overall safety or functionality of the vehicle. According to such further embodiment, additionally or alternatively the at least one security recommendation includes a recommendation to disable one or more nonessential subsystems of the vehicle responsive to determining that the impact of the vehicle security fault is isolated to a one or more nonessential subsystems of the vehicle. According to such further embodiment, the vehicle server application optionally executes a recommendation to disable some or all functional capabilities of the vehicle by facilitating vehicle disablement in accordance with one or more steps of the method 700.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A method comprising:
receiving a first measurement value from a first sensor among a plurality of sensors associated with a vehicle;
receiving a second measurement value from a second sensor among the plurality of sensors;
identifying at least one sensor abnormality resulting from at least one inherent manufacturing defect by determin- ing that the first measurement value and the second measurement value are indicative of contradictory vehicle metrics; and completing at least one predefined action to address the at least one sensor abnormality, wherein completing the at least one predefined action comprises transferring responsibility of sensor functionality according to a sensor failover procedure and analyzing recorded vehicle-specific sensor defect metadata in the context of collective sensor defect metadata derived from a plurality of vehicles to identify a pattern with respect to at least one defective vehicle part.

2. The method of claim 1, wherein identifying the at least one sensor abnormality comprises:

responsive to determining that a vehicle metric measured by the first sensor is comparable to a vehicle metric measured by the second sensor:

determining that the first measurement value differs from the second measurement value beyond a predefined threshold;

receiving a third measurement value from a third sensor among the plurality of sensors;

identifying the first sensor as abnormal responsive to determining that the third measurement value differs from the first measurement value beyond the predefined threshold; and identifying the second sensor as abnormal responsive to determining that the third measurement value differs from the second measurement value beyond the predefined threshold.

3. The method of claim 1, wherein completing the at least one predefined action further comprises:

responsive to determining that the at least one sensor abnormality is isolated to a one or more nonessential subsystems of the vehicle, disabling the one or more nonessential subsystems.

4. The method of claim 1, wherein completing the at least one predefined action further comprises:

responsive to determining that the at least one sensor abnormality affects overall safety or functionality of the vehicle, disabling all functional capabilities of the vehicle.

5. The method of claim 1, wherein identifying the pattern with respect to the at least one defective vehicle part comprises calculating a similarity factor as a ratio of a total number of metadata matches found among analogous vehicle sensors of multiple vehicles that are associated with the at least one defective vehicle part to a total number of possible metadata matches based upon a comparison of metadata aspects of the analogous vehicle sensors.

6. The method of claim 1, wherein completing the at least one predefined action further comprises:

updating a known errors system based upon the identified pattern.

7. The method of claim 1, wherein completing the at least one predefined action further comprises:

determining a recall protocol with respect to the at least one defective vehicle part based upon the identified pattern.

8. The method of claim 1, wherein completing the at least one predefined action comprises transferring the responsibility of sensor functionality to duplicate vehicle sensors.

9. The method of claim 1, wherein the first measurement value is indicative of vehicle speed, and wherein the second measurement value is indicative of vehicle distance travelled.

10. The method of claim 1, wherein the first measurement value is indicative of vehicle speed, and wherein the second measurement value is indicative of vehicle proximity to an obstacle.

11. The method of claim 1, wherein the first measurement value is indicative of vehicle speed, and wherein the second measurement value is indicative of vehicle altitude.

12. The method of claim 1, wherein completing the at least one predefined action comprises transferring the responsibility of sensor functionality to standby vehicle sensors.

13. A computer program product comprising a computer readable storage medium having program instructions embodied therewith, the program instructions executable by a computing device to cause the computing device to:

receive a first measurement value from a first sensor among a plurality of sensors associated with a vehicle;

receive a second measurement value from a second sensor among the plurality of sensors;

identify at least one sensor abnormality resulting from at least one inherent manufacturing defect by determining that the first measurement value and the second measurement value are indicative of contradictory vehicle metrics; and complete at least one predefined action to address the at least one sensor abnormality, wherein completing the at least one predefined action comprises transferring responsibility of sensor functionality according to a sensor failover procedure and analyzing recorded vehicle-specific sensor defect metadata in the context of collective sensor defect metadata derived from a plurality of vehicles to identify a pattern with respect to at least one defective vehicle part.

14. The computer program product of claim 13, wherein identifying the at least one sensor abnormality comprises:

responsive to determining that a vehicle metric measured by the first sensor is comparable to a vehicle metric measured by the second sensor:

determining that the first measurement value differs from the second measurement value beyond a predefined threshold;

receiving a third measurement value from a third sensor among the plurality of sensors;

identifying the first sensor as abnormal responsive to determining that the third measurement value differs from the first measurement value beyond the predefined threshold; and identifying the second sensor as abnormal responsive to determining that the third measurement value differs from the second measurement value beyond the predefined threshold.

15. The computer program product of claim 13, wherein completing the at least one predefined action further comprises:

responsive to determining that the at least one sensor abnormality is isolated to a one or more nonessential subsystems of the vehicle, disabling the one or more nonessential subsystems.

16. The computer program product of claim 13, wherein completing the at least one predefined action further comprises:

responsive to determining that the at least one sensor abnormality affects overall safety or functionality of the vehicle, disabling all functional capabilities of the vehicle.

17. A system comprising:

a processor; and a memory storing an application program, which, when executed on the processor, performs an operation comprising:

receiving a first measurement value from a first sensor among a plurality of sensors associated with a vehicle;

receiving a second measurement value from a second sensor among the plurality of sensors;

identifying at least one sensor abnormality resulting from at least one inherent manufacturing defect by determining that the first measurement value and the second measurement value are indicative of contradictory vehicle metrics; and completing at least one predefined action to address the at least one sensor abnormality, wherein completing the at least one predefined action comprises transferring responsibility of sensor functionality according to a sensor failover procedure and analyzing recorded vehicle-specific sensor defect metadata in the context of collective sensor defect metadata derived from a plurality of vehicles to identify a pattern with respect to at least one defective vehicle part.

18. The system of claim 17, wherein identifying the at least one sensor abnormality comprises:

responsive to determining that a vehicle metric measured by the first sensor is comparable to a vehicle metric measured by the second sensor:

determining that the first measurement value differs from the second measurement value beyond a predefined threshold;

receiving a third measurement value from a third sensor among the plurality of sensors;

identifying the first sensor as abnormal responsive to determining that the third measurement value differs from the first measurement value beyond the predefined threshold; and identifying the second sensor as abnormal responsive to determining that the third measurement value differs from the second measurement value beyond the predefined threshold.

19. The system of claim 17, wherein completing the at least one predefined action further comprises:

responsive to determining that the at least one sensor abnormality is isolated to a one or more nonessential subsystems of the vehicle, disabling the one or more nonessential subsystems.

\* \* \* \* \*